S. Cary.
Earth Auger.
N°57,058. Patented Aug. 7, 1866.
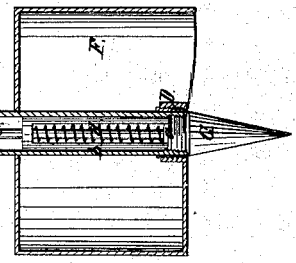
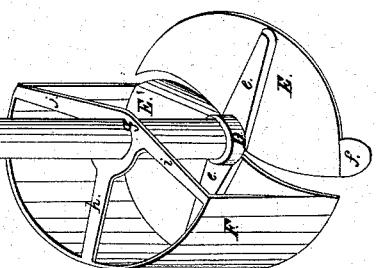
Witnesses:
Edw. F. Brown
J. B. Woodruff
Inventor:
Samuel Cary

UNITED STATES PATENT OFFICE.

SAMUEL CARY, OF CENTREVILLE, LOUISIANA.

IMPROVED BORING APPARATUS.

Specification forming part of Letters Patent No. 57,058, dated August 7, 1866.

*To all whom it may concern:*

Be it known that I, SAMUEL CARY, of Centreville, in the parish of St. Mary's, in the State of Louisiana, have invented certain new and useful Improvements in Boring Apparatus for post-holes, wells, and for other purposes; and the following is a full, clear, and exact description of the same, reference being made to the accompanying drawings, making a part of this specification, in which—

Figure 1 represents a perspective view of the boring apparatus. Fig. 2 is a perpendicular view of the same. Fig. 3 shows a section through the tube-shank with the cone-point spring-valve for admitting air under the auger to relieve the vacuum when being withdrawn.

The object of my invention is to be able to raise the auger easily when boring in the earth and water by admitting a supply of air through the shank of the auger to any desired depth, thereby relieving the vacuum.

My invention consists in the construction and application of the center-point spring-valve, in combination with the double spur-lip cutter-blades, semicircular scoop, and tube-shank for coupling to and extending to any desired depth, as hereinafter more fully described.

To enable others skilled in the art to make and use my invention, I will describe it more fully, referring to the drawings and to the letters of reference marked thereon.

I make the shank A of my boring apparatus out of wrought-iron water or gas pipe, into the lower end of which I fit a screw, $a$, with an open-sided pipe, $b$, into which the spindle or rod $c$ of the center-point C is fitted so as to slide, it being held up against the bottom of the screw $a$ by a spiral spring, $d$, around the rod $c$ in the open space $b$, so as to entirely close up the bottom of the tube or shank A while boring.

Onto the outside of the lower end of the shank A an arm-socket, D, is screwed. To the arms $o\ o$ are fastened the steel cutting-disks E E', they having lips $ff$ to cut the circle of the bore smooth. On one of the cutting-disks, E', I have a semicircular scoop F, to extend up the side of the bore to any desired height, the top being braced to the shank A by a socket, $g$, with arms $h\ i\ j$.

For the purpose of boring by hand, I have a wood handle, B, into which is fitted a screw-socket, $k$, of metal, to screw onto the top of the tube-auger shaft A. In boring wells other tubes may be screwed on as the shaft is sunk, and the operation continued by the same handle, or power machinery may be applied.

It is well known that in boring the earth with augers of similarly-constructed bits there is a great difficulty in raising them out of the shaft or bore, the earth and water forming a packing, so that no air can possibly get under the loosened mass. By my center-point valve and hollow shaft, as above described, the vacuum is entirely relieved, and no difficulty is experienced in removing the bit and loosened mass.

Having thus fully described my invention, what I claim as new, and desire to secure by Letters Patent, is—

The combination and application of the center-point spring-valve, with the double spur-lip cutter-blades, semicircular scoop, and tubular shank, for coupling to for any desired depth, substantially as herein described, for the purposes specified.

Sworn and subscribed to on this 10th day of July, A. D. 1866.

SAMUEL CARY.

Witnesses:
EDM. F. BROWN,
J. B. WOODRUFF.